(12) United States Patent
Liu et al.

(10) Patent No.: US 10,619,912 B2
(45) Date of Patent: Apr. 14, 2020

(54) MULTI-LAYER GAS BARRIER MATERIALS FOR VACUUM INSULATED STRUCTURE

(71) Applicant: WHIRLPOOL CORPORATION, Benton Harbor, MI (US)

(72) Inventors: Hua Liu, St. Joseph, MI (US); Laksha J. Deka, Mishiwaka, IN (US); Mohamed Alshourbagy, Stevensville, MI (US); Diptesh Mukherjee, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/663,416

(22) Filed: Oct. 25, 2019

(65) Prior Publication Data

US 2020/0056830 A1    Feb. 20, 2020

Related U.S. Application Data

(63) Continuation of application No. 16/003,302, filed on Jun. 8, 2018, which is a continuation of application
(Continued)

(51) Int. Cl.
*F25D 23/00* (2006.01)
*B29C 51/00* (2006.01)
(Continued)

(52) U.S. Cl.
CPC ........... *F25D 23/062* (2013.01); *B29C 51/00* (2013.01); *B29C 51/082* (2013.01); *B29C 51/14* (2013.01);
(Continued)

(58) Field of Classification Search
CPC .......... F25D 23/00; F25D 23/06; F25D 23/06; F25D 23/062; B29C 51/00; B29C 51/08;
(Continued)

(56) References Cited

U.S. PATENT DOCUMENTS 5,018,328 A    5/1991  Cur et al.
5,121,593 A *  6/1992  Forslund ............... B21D 51/32
                                             52/404.1
(Continued)

FOREIGN PATENT DOCUMENTS

DE           19915311 A1    10/2000
DE        102012223536 A1     6/2014
(Continued)

*Primary Examiner* — Jacob T Minskey
*Assistant Examiner* — Matthew Hoover
(74) *Attorney, Agent, or Firm* — Price Heneveld LLP

(57) ABSTRACT

A vacuum insulated structure includes a multi-layer sheet of material comprising at least one layer of barrier material that is disposed between first and second outer layers. The barrier material and the first and second outer layers comprise thermoplastic polymers or elastomeric or hybrid material systems. The multi-layer sheet of material is thermoformed or vacuum formed to form a non-planar first component having a central portion and four sidewalls extending transversely from the central portion. A second component having a central portion and four sidewalls extending transversely from the central portion is secured to the first component to form an interior space therebetween. Porous filler material is positioned in the interior space, and a vacuum is formed in the interior space by removing gasses and moisture (water vapor). The first and second components are sealed together to form a vacuum insulated structure.

20 Claims, 5 Drawing Sheets

Related U.S. Application Data

No. 14/980,778, filed on Dec. 28, 2015, now Pat. No. 10,018,406.

(51) Int. Cl.

| | | |
|---|---|---|
| *B32B 27/00* | (2006.01) | |
| *F25D 23/06* | (2006.01) | |
| *F16L 59/065* | (2006.01) | |
| *B32B 3/08* | (2006.01) | |
| *B32B 7/08* | (2019.01) | |
| *B32B 3/04* | (2006.01) | |
| *B32B 1/00* | (2006.01) | |
| *B32B 27/36* | (2006.01) | |
| *B32B 27/34* | (2006.01) | |
| *B32B 27/32* | (2006.01) | |
| *B32B 27/30* | (2006.01) | |
| *B32B 27/14* | (2006.01) | |
| *B32B 27/08* | (2006.01) | |
| *B32B 15/16* | (2006.01) | |
| *B32B 7/12* | (2006.01) | |
| *B32B 5/16* | (2006.01) | |
| *B29C 51/26* | (2006.01) | |
| *B29C 51/14* | (2006.01) | |
| *B29C 51/08* | (2006.01) | |
| *B32B 3/06* | (2006.01) | |

(52) U.S. Cl.
CPC .............. *B29C 51/267* (2013.01); *B32B 1/00* (2013.01); *B32B 3/04* (2013.01); *B32B 3/06* (2013.01); *B32B 3/08* (2013.01); *B32B 5/16* (2013.01); *B32B 7/08* (2013.01); *B32B 7/12* (2013.01); *B32B 15/16* (2013.01); *B32B 27/08* (2013.01); *B32B 27/14* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *F16L 59/065* (2013.01); *B32B 2250/03* (2013.01); *B32B 2250/04* (2013.01); *B32B 2250/05* (2013.01); *B32B 2250/24* (2013.01); *B32B 2250/40* (2013.01); *B32B 2250/44* (2013.01); *B32B 2260/025* (2013.01); *B32B 2264/06* (2013.01); *B32B 2264/10* (2013.01); *B32B 2264/101* (2013.01); *B32B 2264/102* (2013.01); *B32B 2307/704* (2013.01); *B32B 2307/7242* (2013.01); *B32B 2307/7244* (2013.01); *B32B 2307/7246* (2013.01); *B32B 2307/732* (2013.01); *B32B 2307/738* (2013.01); *B32B 2509/10* (2013.01); *F25D 2201/14* (2013.01)

(58) Field of Classification Search
CPC ....... B29C 51/08; B29C 51/082; B29C 51/10; B29C 51/14; B29C 51/20; B29C 51/26; B29C 51/26; B29C 51/267; B32B 27/00; B32B 27/30; B32B 27/32
See application file for complete search history.

(56) References Cited

U.S. PATENT DOCUMENTS

| | | | |
|---|---|---|---|
| 5,507,999 A * | 4/1996 | Copsey | ................... B29C 51/18 264/545 |
| 5,512,345 A | 4/1996 | Tsutsumi et al. | |
| 7,993,723 B2 | 8/2011 | Jung et al. | |
| 9,464,430 B2 | 10/2016 | Kimura et al. | |
| 10,018,406 B2 | 7/2018 | Liu et al. | |
| 2005/0131162 A1 | 6/2005 | Tanaka et al. | |
| 2012/0148785 A1 | 6/2012 | Hsu et al. | |
| 2013/0052393 A1 | 2/2013 | Hahn et al. | |
| 2013/0101779 A1 | 4/2013 | Soh et al. | |
| 2013/0256319 A1 | 10/2013 | Kuehl et al. | |
| 2013/0270732 A1 | 10/2013 | Wu et al. | |
| 2015/0118435 A1 | 4/2015 | Kimura et al. | |
| 2017/0182607 A1 | 6/2017 | Liu et al. | |
| 2018/0292124 A1 | 10/2018 | Liu et al. | |

FOREIGN PATENT DOCUMENTS

| | | |
|---|---|---|
| DE | 102012223541 A1 | 6/2018 |
| JP | 2015081676 A | 4/2015 |
| JP | 2015092105 A | 5/2015 |
| JP | 2015092106 A | 5/2015 |
| RU | 2252377 C2 | 5/2005 |
| WO | 0202987 A1 | 1/2002 |
| WO | 02052208 A1 | 7/2002 |
| WO | 2010127947 A2 | 11/2010 |
| WO | 2012031885 A2 | 3/2012 |
| WO | 2012044001 A2 | 4/2012 |
| WO | 2015095542 A1 | 6/2014 |
| WO | 2014184393 A1 | 11/2014 |
| WO | WO-2014184393 A1 * | 11/2014 |

* cited by examiner

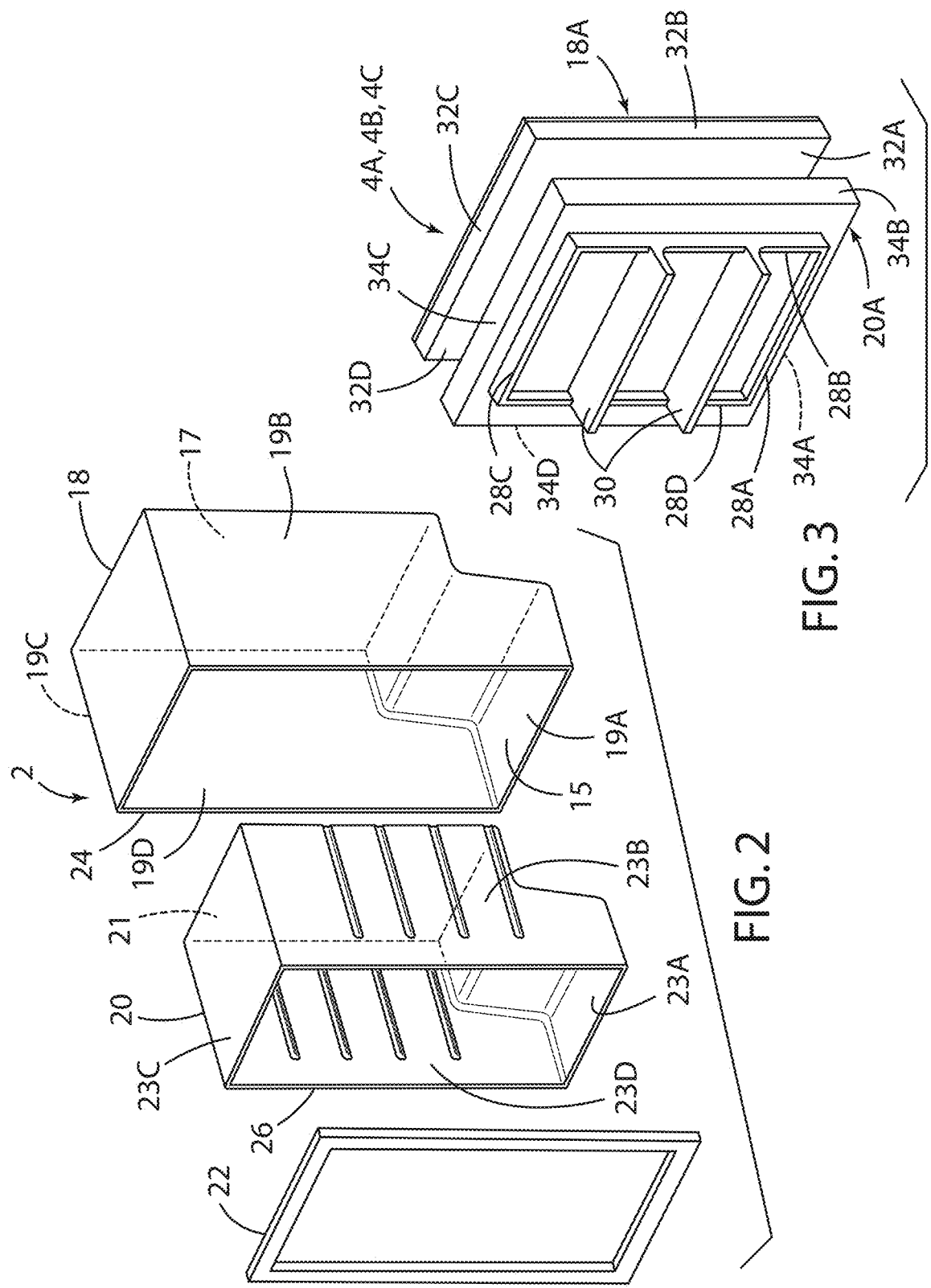

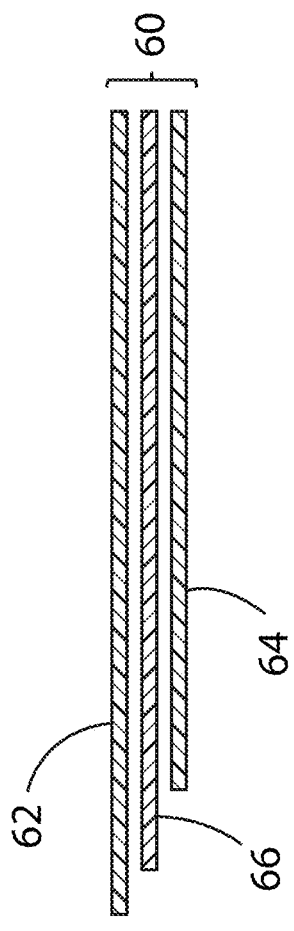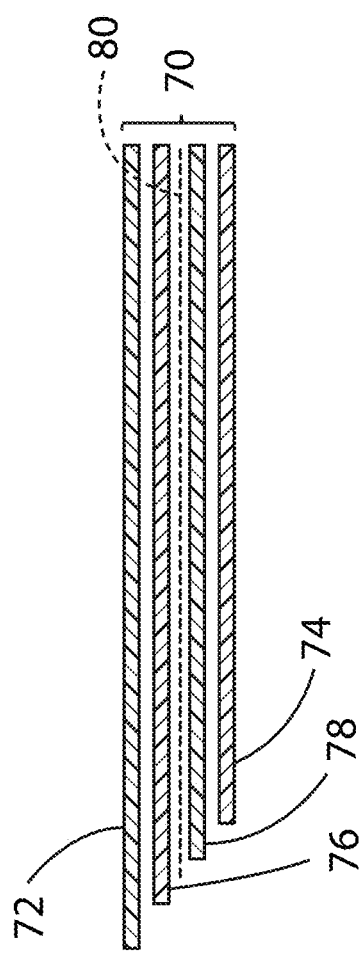
FIG. 5
FIG. 6

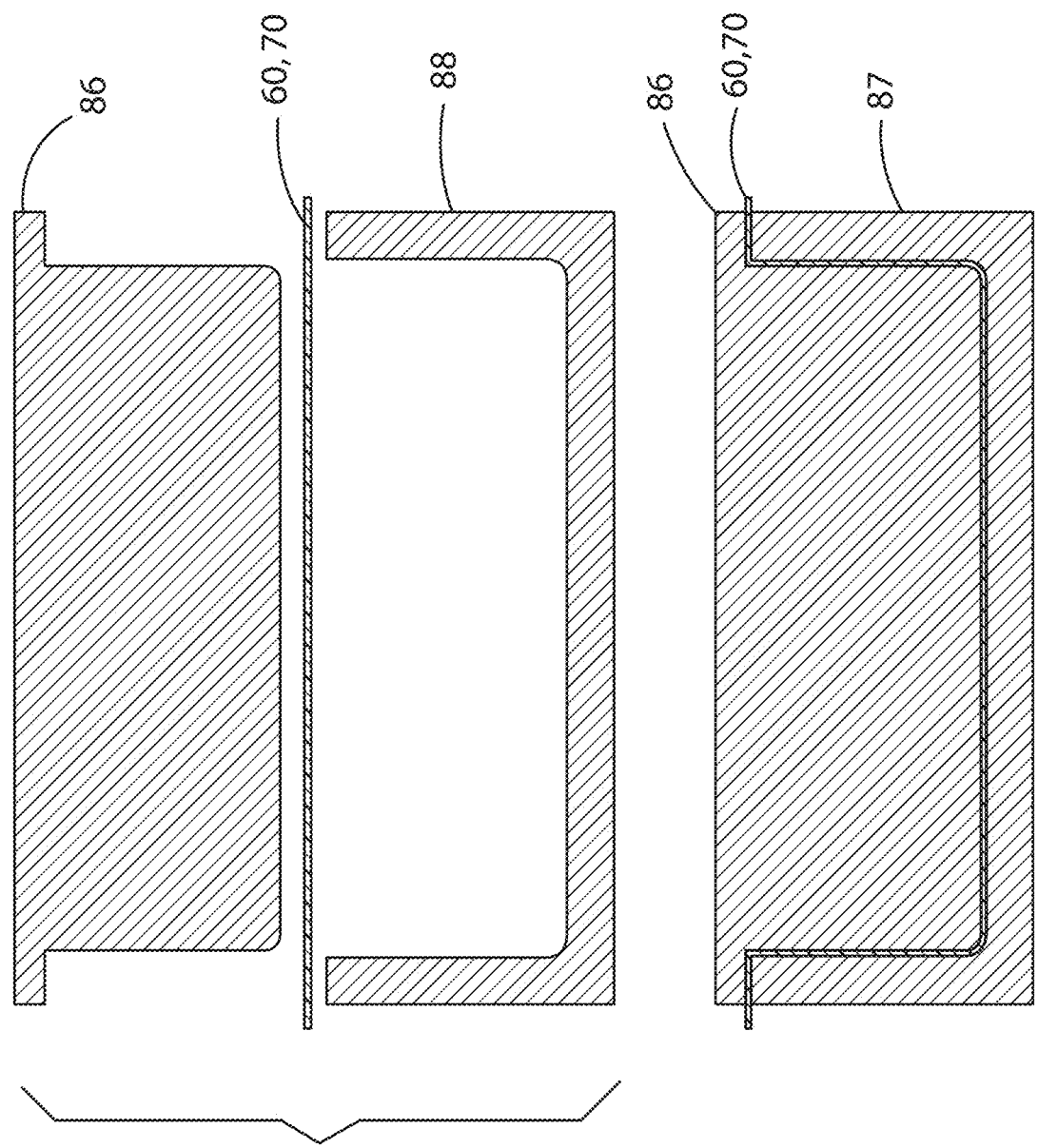

MULTI-LAYER GAS BARRIER MATERIALS FOR VACUUM INSULATED STRUCTURE

BACKGROUND OF THE INVENTION

The present application is a Continuation of U.S. patent application Ser. No. 16/003,302, filed on Jun. 8, 2018, now U.S. Pat. No. 10,514,198, issued on Dec. 24, 2019, which is a Continuation of U.S. patent application Ser. No. 14/980,778, now U.S. Pat. No. 10,018,406, both of which are entitled "MULTI-LAYER GAS BARRIER MATERIALS FOR VACUUM INSULATED STRUCTURE," filed Dec. 28, 2015. The entire disclosures of each are incorporated herein by reference.

BACKGROUND OF THE INVENTION

Various types of vacuum panels and other vacuum insulated structures have been developed for use in refrigerator cabinets, doors, cooking cavities (ovens), dryer systems, water heaters, freezers, insulation boxes and pipe systems and other such components. Vacuum insulated structures may have superior insulation properties relative to conventional polyurethane foam insulation. However, known vacuum insulated structures and processes for fabricating such structures may suffer from various drawbacks.

SUMMARY OF THE INVENTION

A vacuum insulated structure includes a multi-layer sheet of material comprising at least one layer of barrier material that is disposed between first and second outer layers. The barrier material and the first and second outer layers comprise thermoplastic polymers or elastomeric or hybrid material systems. The multi-layer sheet of material is thermoformed or vacuum formed to form a non-planar first component having a central portion and four sidewalls extending transversely from the central portion. A second component having a central portion and four sidewalls extending transversely from the central portion is secured to the first component to form an interior space therebetween. Porous filler material is positioned in the interior space, and a vacuum is formed in the interior space. The first and second components are sealed together to form a vacuum insulated structure.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is an exploded isometric view of a refrigerator cabinet;

FIG. 3 is an exploded isometric view of a vacuum insulated door structure for a refrigerator;

FIG. 4 is partially schematic cross sectional view of a multilayer material that may be utilized to form wrappers, liners, and other such components of refrigerator cabinets, doors, and the like;

FIG. 5 is a partially schematic exploded cross sectional view of a three-layer sheet of material;

FIG. 6 is a partially schematic exploded cross sectional view of a four-layer sheet of material;

FIG. 7 is a schematic view of a thermoforming tool/process; and

FIG. 8 is a schematic view of a thermoforming tool/process.

DETAILED DESCRIPTION

Figure 1:
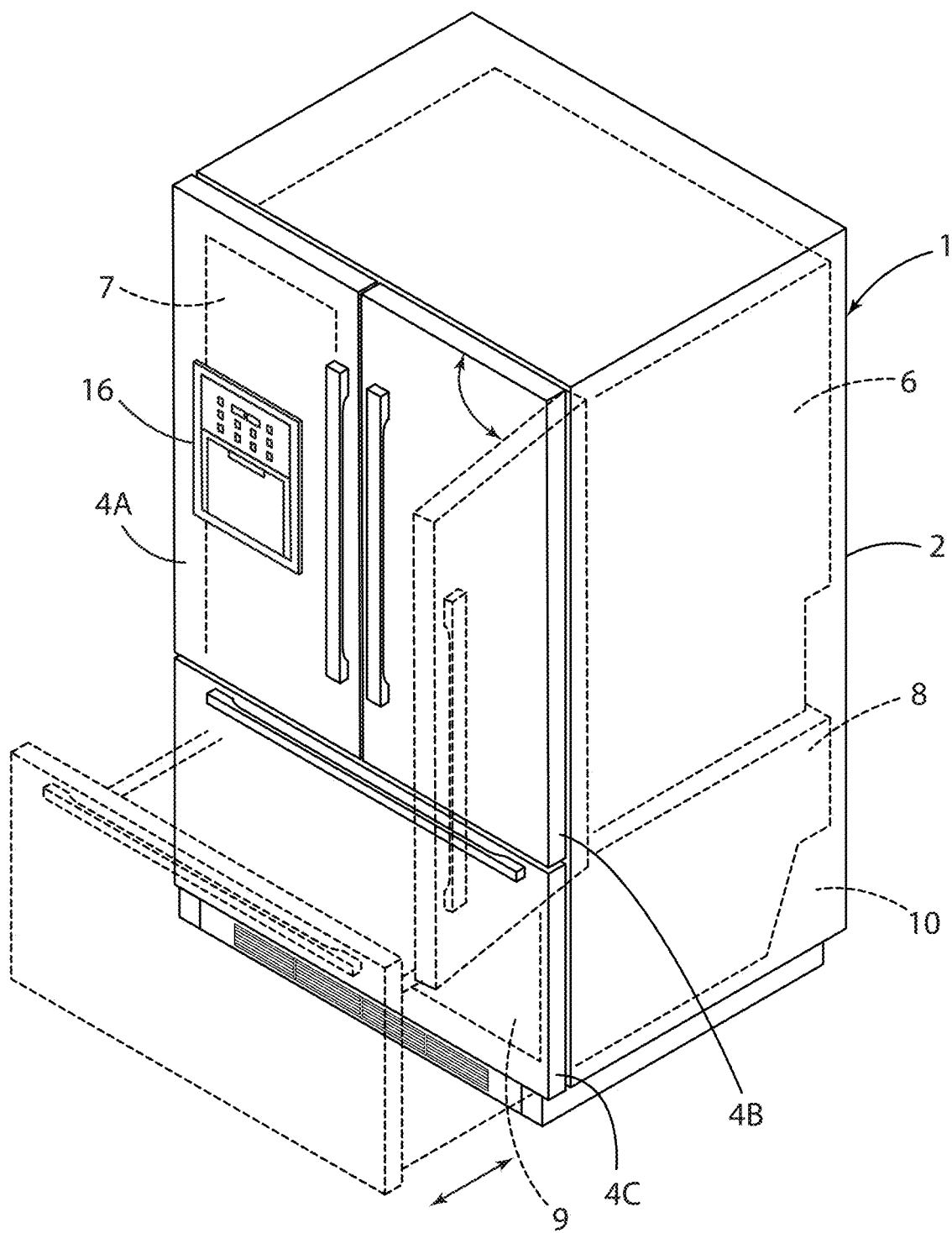
FIG. 1 is an isometric view of a refrigerator.

For purposes of description herein, the terms "upper," "lower," "right," "left," "rear," "front," "vertical," "horizontal," and derivatives thereof shall relate to the device as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes an insulated cabinet 2 having an upper fresh food compartment 6 that can be accessed through access opening 7 by opening doors 4A and 4B. The insulated refrigerator cabinet 2 also includes an insulated freezer compartment 8 that can be accessed through access opening 9 by opening a lower door/drawer 4C. Refrigerator 1 may include a cooling system (not shown) disposed in a machine compartment 10. The cooling system may include a compressor, condenser, evaporator, and other related components that are generally known in the art. Alternatively, the cooling system may comprise one or more thermoelectric elements. Door 4A may include an ice/water dispenser 16.

With further reference to FIG. 2, refrigerator cabinet 2 may comprise a wrapper 18 and a liner 20 that fits inside the wrapper 18 when assembled. An optional trim piece 22 may be utilized to interconnect and seal off front edges 24 and 26 of wrapper 18 and liner 20, respectively, when cabinet 2 is assembled. As discussed in more detail below, wrapper 18, liner 20, and/or trim piece 22 may be formed from a multilayer thermoplastic polymer material including one or more barrier layers that are substantially impervious to nitrogen, oxygen, water vapor, carbon dioxide, and other such gasses whereby a vacuum can be maintained in an internal space between wrapper 18 and liner 20. The trim piece may comprise thermosetting polymer material with or without fillers or reinforcements (e.g. fibers) and may optionally include a barrier coating. One or more of the components 18, 20 and 22 may optionally be made from metal or other suitable material. For example, wrapper 18 may be made from sheet metal, and liner 20 may be made from a multi-layer thermoformed polymer material having gas barrier properties. Wrapper 18 may include a generally planar central sidewall portion 17, and four sidewalls 19A-19D that extend transversely from the central sidewall portion 17 to define an interior space 15 that receives liner 20 when assembled. Liner 20 may include a generally planar rectangular central sidewall 21 that is spaced from central sidewall 17 of wrapper 18 when assembled. The liner 20 also includes sidewalls 23A-23D that extend transversely from the central sidewall 21. When assembled, the sidewalls 23A-23D are spaced inwardly from the sidewalls 19A-19D, respectively, of wrapper 18 to form a gap or space therebetween that may be filled with a porous filler material and evacuated to form a vacuum.

With further reference to FIG. 3, a refrigerator door 4A-4C may include an outer panel member 18A, and an inner liner 20A. The outer panel member 18A and liner 20A may be formed from a multilayer thermoformed polymer material having barrier properties as discussed below to thereby permit forming a vacuum between outer member 18A and liner 20A when assembled. The outer door member 18A may, alternatively, be formed from sheet metal or other material. Outer member 18A may include flanges 32A-32D that fit over and overlap corresponding flanges 34A-34B of liner 20A when assembled. The liner 20A may optionally include one or more raised ribs 28A-28C and shelves 30 as may be required for a particular application.

Figure 4:
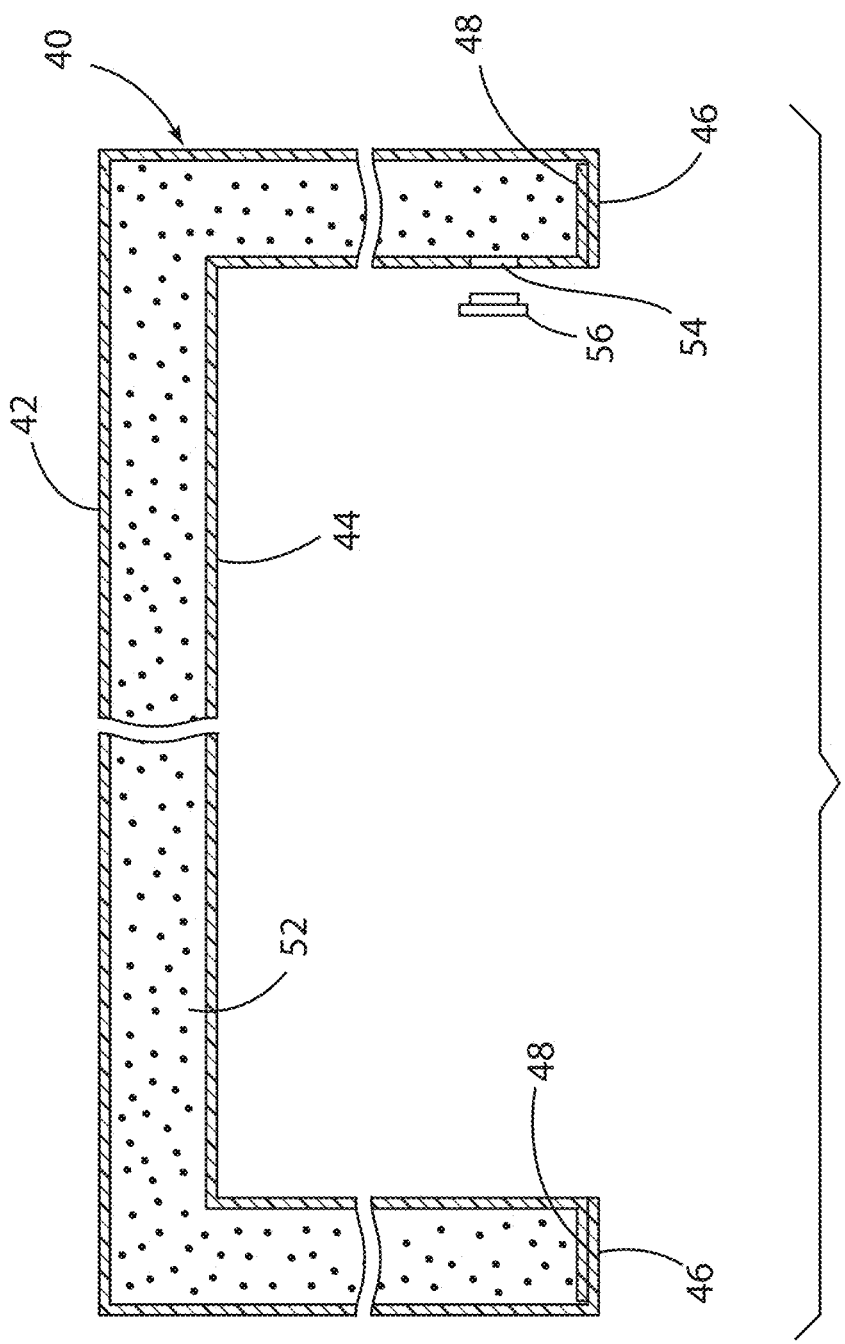

With reference to FIG. 4, a vacuum insulated refrigerator structure 40 includes a multi-layer polymer wrapper 42 and a multi-layer polymer liner 44. Wrapper 42 and/or liner 44 may comprise thermoformed tri-layer polymer material 60 (FIG. 5) or thermoformed quad-layer polymer material 70 (FIG. 6). Vacuum insulated structure 40 may comprise a vacuum insulated cabinet structure 2, a vacuum insulated door 4A-4C, or other vacuum insulated refrigerator structure. Polymer wrapper 42 may include flanges 46 that overlap flanges 48 of polymer liner 44. The flanges 46 and 48 may be interconnected to form an airtight seal. Alternatively, the polymer wrapper 42 and polymer liner 44 may be interconnected utilizing other suitable connecting structures and techniques such as adhesive joining, welding, or a compression fitting gasket joint. The polymer wrapper 42 and polymer liner 44 form an interior space 50 that may be filled with a porous filler material 52 such as nano or micro porous insulating material such as fumed silica, precipitated silica, hollow glass microsphere, perlite, rice husk ash, ceno sphere or fly ash, and the interior space 50 may be evacuated and sealed whereby the interior space 50 defines a vacuum. During fabrication, the polymer wrapper 42 and polymer liner 44 may be assembled together and sealingly interconnected. The wrapper and liner 42 and 44 may then be placed in a vacuum chamber, and nano or micro porous insulation material 52 such as fumed silica, precipitated silica, hollow glass microsphere, perlite, rice husk ash, cenosphere or fly ash may be introduced into the interior space 50 through one or more openings 54. The openings 54 may then be sealed with a barrier cap 56, and the vacuum insulated refrigerator structure 40 may then be removed from the vacuum chamber.

With further reference to FIG. 5, the wrapper 42 and/or liner 44 may be thermoformed from a tri-layer sheet 60 of polymer material. The sheet 60 comprises first and second outer structural layers 62 and 64 and a barrier layer 66 that is disposed between the first and second outer structural layers 62 and 64, respectively. The layers 62, 64, and 66 comprise thermoplastic polymers or elastomeric material which may be thermoformed utilizing various processes as discussed below in connection with FIGS. 7 and 8. Layers 62, 64, and 66 are shown in a spaced apart exploded view in FIG. 5. However, it will be understood that the layers 62, 64, and 66 are coextruded or laminated together to form a single multi-layer sheet prior to thermoforming. The first and second outer layers 62 and 64, respectively, may comprise a suitable thermoplastic polymer material such as High Impact Polystyrene (HIPS) or Acrylonitrile, Butadiene and Styrene (ABS), Polypropylene or Poly Butylene Teraphthalate or Polyethylene. The barrier layer 66 may comprise a thermoplastic polymer or elastomeric material that is impervious to one or more gasses such as nitrogen, oxygen, water vapor, carbon dioxide, etc. such that the wrapper and liner 42 and 44 (FIG. 4) provide a barrier to permit forming a vacuum in interior space 50. The barrier layer 66 preferably comprises a material that blocks both oxygen and water vapor simultaneously. Examples of such material include Polyvinylidene Chloride (PVdC), nylon, or liquid crystal polymer. The layers 62, 64, and 66 may be co-extruded or laminated together. The thickness of the barrier layer 66 may be adjusted as required for different applications to meet varied requirements with respect to oxygen and water vapor transmission rates. The materials of layers 62, 64, and 66 are selected to have very good thermoforming properties to permit deep draw ratio thermoforming of components such as wrapper 18 and liner 20 (FIG. 2) and the door components 18A and 20A (FIG. 3), and other vacuum insulated refrigerator structures. Typically, the first outer layer 62, and the second outer layer 64 has a thickness of about 0.1 mm to 10 mm, and the barrier layer has a thickness of about 0.1 mm to 10 mm.

The following are examples of material combinations that may be utilized to form tri-layer sheet 60:
Example 1: HIPS/PVdC/HIPS
Example 2: HIPS/Nylon/HIPS
Example 3: HIPS/MXD-6 Nylon/HIPS
Example 4: HIPS/MXD-6 Nylon with clay filler/HIPS
Example 5: HIPS/Liquid Crystal Polymer/HIPS With further reference to FIG. 6, a quad-layer sheet 70 having first and second outer layers 72 and 74, respectively, and two barrier layers 76 and 78 may also be utilized to form wrapper 18, liner 20 (FIG. 2) and outer member 18A and inner member 20A (FIG. 3) to form vacuum insulated refrigerator cabinet structures, vacuum insulated doors, or cooking cavities (e.g. ovens), dryer systems, water heaters, freezers, insulation boxes and pipe systems other such components. The outer structural layers 72 and 74 may comprise HIPS, ABS, or other suitable polymer material that is capable of being thermoformed. The first barrier layer 76 may comprise a thermoplastic polymer material that is substantially impervious to water vapor. Examples of thermoplastic polymer or elastomeric materials for first barrier layer 76 include fluoropolymer such as Tetrafluoroethylene (THV), polychlorotrifluoroethylene (PCTFE), Cyclic Olefin Copolymer (COC), Cyclic Olefin Polymer (COP) or high density polyethylene (HDPE). The second barrier layer 78 may comprise a thermoplastic polymer that is substantially impervious to oxygen. Examples of thermoplastic polymer materials include Ethylene vinyl alcohol (EVOH). An optional tie layer 80 comprising a thermoplastic polymer material may be disposed between the barrier layers 76 and 78. Tie layer 80 may be utilized to bond barrier layers 76 and 78 to one another. Examples of suitable materials for the tie layer include adhesive resins, such as modified polyolefin with functional groups that are capable of bonding to a variety of polymers and metals.

The following are examples of material combinations that may be utilized to form quad-layer sheet 70:
Example 1: HIPS/EVOH/HDPE/HIPS
Example 2: HIPS/EVOH/COP/HIPS
Example 3: HIPS/EVOH/COC/HIPS
Example 4: HIPS/EVOH/THV/HIPS
Example 5: HIPS/EVOH/PCTFE/HIPS Layers 72, 74, 76, 78 and 80 are coextruded or laminated together to form a single sheet of material prior to thermoforming.

With further reference to FIGS. 7 and 8, multi-layer sheets 60 and 70 may be thermoformed utilizing male and female mold parts 86 and 88, respectively. Sheet 60 or 70 is initially positioned between mold parts 86 and 88 as shown in FIG. 7, and the sheet 60 or 70 is heated to temperature at which the sheet 60 or 70 can be plastically deformed by pressing the mold parts together as shown in FIG. 8 to form a wrapper, liner, or other such component. As used herein, the term "thermoforming" and variations thereof broadly means a forming process in which a sheet of thermoplastic polymer material is heated and formed, and "thermoforming" is not limited to the specific process/tools shown in FIGS. 7 and 8. For example, components may be thermoformed utilizing a vacuum forming process whereby a vacuum is utilized to deform sheet 60 or 70 to fit closely in female mold 87 such that a male mold part 86 is not required.

It will be understood that wrappers, liners, and other such components as disclosed herein are not limited to the tri-layer sheet 60 or the quad-layer sheet 70 configurations described above, and additional layers of material may also be utilized.

It is to be understood that variations and modifications can be made on the aforementioned structure without departing from the concepts of the present disclosure, and further it is to be understood that such concepts are intended to be covered by the following claims unless these claims by their language expressly state otherwise.

The invention claimed is:

1. A refrigerator, comprising:
a cabinet having a base portion configured to support the refrigerator in an upright position on a surface, the cabinet including at least one food storage compartment that is accessible through an access opening on a front side of the cabinet;
at least one door movably mounted to the cabinet adjacent the access opening; wherein the cabinet comprises:
an outer wrapper having an upright rear wall disposed to the rear of the food storage compartment, first and second upright sidewalls that are horizontally spaced-apart from each other and disposed on opposite sides of the food storage compartment, and upper and lower horizontal sidewalls that are vertically spaced-apart from each other and disposed above and below, respectively, of the food storage compartment, wherein the outer wrapper comprises a one-piece continuous multi-layer sheet of material including at least one layer of barrier material disposed between first and second outer layers, wherein the barrier material and the first and second outer layers comprise thermoplastic polymers;
an inner liner having an upright rear wall and upright sidewalls that are horizontally spaced-apart from each other, and upper and lower horizontal sidewalls that are vertically spaced-apart from each other, wherein the inner liner comprises a one-piece continuous multi-layer sheet of material including at least one layer of barrier material disposed between first and second outer layers, wherein the barrier material and the first and second outer layers comprise thermoplastic polymers, and wherein the inner liner is disposed substantially inside the outer wrapper and the inner liner is secured to the outer wrapper to form an airtight sealed interior space there between; porous filler material disposed in the airtight sealed interior space; and wherein the interior space is substantially evacuated of gasses to form a vacuum around the porous filler material.

2. The refrigerator of claim 1, wherein:
the outer layers of at least one of the outer wrapper and the inner liner comprise at least one of HIPS or ABS, PP, PBT and PE.

3. The refrigerator of claim 2, wherein:
the barrier material of at least one of the outer wrapper and the inner liner comprises at least one of PVdC, nylon, and liquid crystal polymer.

4. The refrigerator of claim 2, wherein:
the at least one layer of barrier material of at least one of the outer wrapper and the inner liner comprises first and second barrier layers comprising first and second barrier materials, respectively, wherein the first barrier material is impervious to water vapor, and the second barrier material is impervious to oxygen.

5. The refrigerator of claim 4, wherein:
the first barrier material of at least one of the outer wrapper and the inner liner comprises at least one of a fluoropolymer, COC, COP, and HDPE.

6. The refrigerator of claim 4, wherein:
the second barrier material of at least one of the outer wrapper and the inner liner comprises EVOH.

7. The refrigerator of claim 4, including:
a tie layer disposed between the first and second barrier layers of at least one of the outer wrapper and the inner liner, wherein the tie layer comprises a tying polymer material that bonds to the first and second barrier materials.

8. The refrigerator of claim 7, wherein:
the tie layer polymer material comprises modified polyolefin with functional groups whereby the tie layer polymer is capable of bonding to polymers and metals.

9. The refrigerator of claim 1, wherein:
the upright rear wall, the upright sidewalls, and the upper and lower horizontal sidewalls of at least one of the outer wrapper and the inner liner are formed by thermoforming the multi-layer sheets of material.

10. The refrigerator of claim 1, wherein:
the upright rear wall of at least one of the outer wrapper and the inner liner has a quadrilateral perimeter and the upright sidewalls extend transversely forward from spaced-apart upright portions of the perimeter, and the upper and lower horizontal sidewalls extend transversely forward from spaced-apart horizontal portions of the perimeter.

11. The refrigerator of claim 10, wherein:
the upright sidewalls and the upper and lower horizontal sidewalls of at least one of the outer wrapper and the inner liner are joined along four integral corners.

12. The refrigerator of claim 11, wherein:
the upright sidewalls of at least one of the outer wrapper and the inner liner include upright upper and lower portions, and a horizontal step extending between the upright upper and lower portions.

13. The refrigerator of claim 11, wherein:
the outer wrapper includes edge flanges extending transversely from front edges of the upright sidewalls and the upper and lower horizontal sidewalls that interconnect and overlap edge flanges of the inner liner to form an airtight seal.

14. The refrigerator of claim 1, wherein:
the upright sidewalls and the upper and lower horizontal sidewalls of at least one of the outer wrapper and the inner liner are substantially planar.

15. A vacuum insulated refrigerator cabinet structure, comprising:
a first component having a central portion and a plurality of sidewalls extending transversely from the central portion, wherein the first component is formed from a multi-layer sheet of material comprising at least one layer of barrier material disposed between first and second outer layers, wherein the barrier material and the first and second outer layers comprise: 1) solely thermoplastic polymer material; or 2) solely elastomeric material; or 3) both thermoplastic polymer material and elastomeric material;

a second component sealed to the first component to form an airtight interior space there between, wherein the second component includes a central portion and a plurality of sidewalls extending transversely from the central portion; porous filler material in the interior space; and wherein the interior space is substantially evacuated of gasses to form a vacuum.

16. The vacuum insulated refrigerator cabinet structure of claim 15, wherein:

the transversely-extending sidewalls are formed from the multi-layer sheet of material by heating and forming the multi-layer sheet of material.

17. The vacuum insulated refrigerator cabinet structure of claim 15, wherein:

the first component comprises a wrapper of a refrigerator cabinet;

the second component comprises a liner of a refrigerator cabinet that is received inside the wrapper.

18. The vacuum insulated refrigerator cabinet structure of claim 15, wherein:

the second component comprises a metal wrapper of a refrigerator cabinet.

19. The vacuum insulated refrigerator cabinet structure of claim 15, wherein:

the outer layers comprise at least one of HIPS or ABS, PP, PBT and PE;

the barrier material comprises at least one of PVdC, nylon, and liquid crystal polymer.

20. The vacuum insulated refrigerator cabinet structure of claim 15, wherein:

the first and second components form a food storage compartment and an enlarged opening providing access to the food storage compartment; and including:

at least one door movably mounted to the refrigerator cabinet structure to selectively close off at least a portion of the enlarged opening when the door is in a closed position.

* * * * *